Nov. 21, 1967 E. FATUZZO 3,354,442

FERROELECTRIC SWITCHING CIRCUITS

Filed March 10, 1964 3 Sheets-Sheet 1

INVENTOR.
ENNIO FATUZZO
BY Samuel Cohen
Attorney

Nov. 21, 1967 E. FATUZZO 3,354,442

FERROELECTRIC SWITCHING CIRCUITS

Filed March 10, 1964 3 Sheets-Sheet 2

INVENTOR.
ENNIO FATUZZO
BY Samuel Cole
Attorney

Nov. 21, 1967 E. FATUZZO 3,354,442

FERROELECTRIC SWITCHING CIRCUITS

Filed March 10, 1964 3 Sheets-Sheet 3

INVENTOR.
ENNIO FATUZZO
BY
Samuel Cohen
Attorney 3,354,442

FERROELECTRIC SWITCHING CIRCUITS

Ennio Fatuzzo, Adliswil, Switzerland, assignor to Radio Corporation of America, a corporation of Delaware Filed Mar. 10, 1964, Ser. No. 350,736
12 Claims. (Cl. 340—173.2)

This invention relates to new and improved ferroelectric control circuits.

When an electric field is applied to a ferroelectric material, the material exhibits a relationship between the polarization of its "bound charge" and the applied field in the general form of the hysteresis loop exhibited by ferromagnetic materials. "Bound charge" refers to the electric dipoles in the material. By utilizing the ferroelectric material as the dielectric of a capacitor, this hysteresis effect can be employed for the storage of binary information, for the control and switching of electric signals, and for other purposes.

In a number of applications, ferroelectric elements would have important advantages if certain problems associated with their use, some of which are discussed in brief below, were overcome. One advantage, for example, is that a ferroelectric element is a relatively high impedance device which is controllable by a voltage and requires very little power. Therefore, in applications in which there are a relatively large number of relatively high impedance loads, ferroelectric elements would appear to be ideal driving and/or switching elements for such loads. An example of this type of application is a panel type display, such as mural television, where ferroelectric elements may be used to control electroluminescent elements. Another advantage of ferroelectric elements is their relatively low cost because of the ease with which they can be mass fabricated. For this additional reason and a number of others, such as small size, light weight, and so on, ferroelectric elements have potential value in many applications where large numbers of control elements are involved.

In view of the above, and in view of the known advantageous operating characteristics of ferromagnetic elements, such as ferrite cores, it has been proposed previously that ferromagnetic and ferroelectric elements be combined in logic circuits, shift registers, and other control and switching applications, to provide improved performance and/or reduced cost.

One example of a magnetic core-diode circuit in which improvement is desired is a well-known shift register. The diodes are of relatively high impedance, and the windings on the cores therefore have a relatively large number of turns. This makes the shift register relatively slow and relatively expensive. Further, the diodes cannot be loaded too heavily and cannot easily be mass produced. Further, the power required, in the case of a register of relatively large size, is excessive.

In combined ferroelectric-ferromagnetic circuits, it is found that the output obtained when switching a ferroelectric element from one state of polarization to the opposite state of polarization is of sufficient magnitude easily to switch a core. However, the reverse is not usually the case; that is, when a core is switched from one state of magnetic remanence to the opposite state of remanence, the output voltage obtained is relatively low, normally too low to switch the polarization of a ferroelectric element. The output voltage can be stepped up by using more turns for the core output winding, but this in itself is disadvantageous, as discussed above. Other means are possible for stepping up the output voltage but these increase the circuit complexity and cost.

The problems above are solved in the present invention, not by having the output voltage obtained from a magnetic core switch the polarization of a ferroelectric element, as in the prior art. Instead, in the circuit of invention, the relatively small output voltage available from a core is employed to steer a charge into a desired one of two paths. The desired path contains the ferroelectric element to be switched. The charge is of relatively large magnitude—sufficient easily to switch the ferroelectric element from one polarization state to another. In the absence of core output voltage, the charge steers into the alternate path and the ferroelectric element of interest remains in its original polarization state.

The invention is discussed in greater detail below and is described in the following drawings, of which:

Figures 1, 2, 3A, 3B:
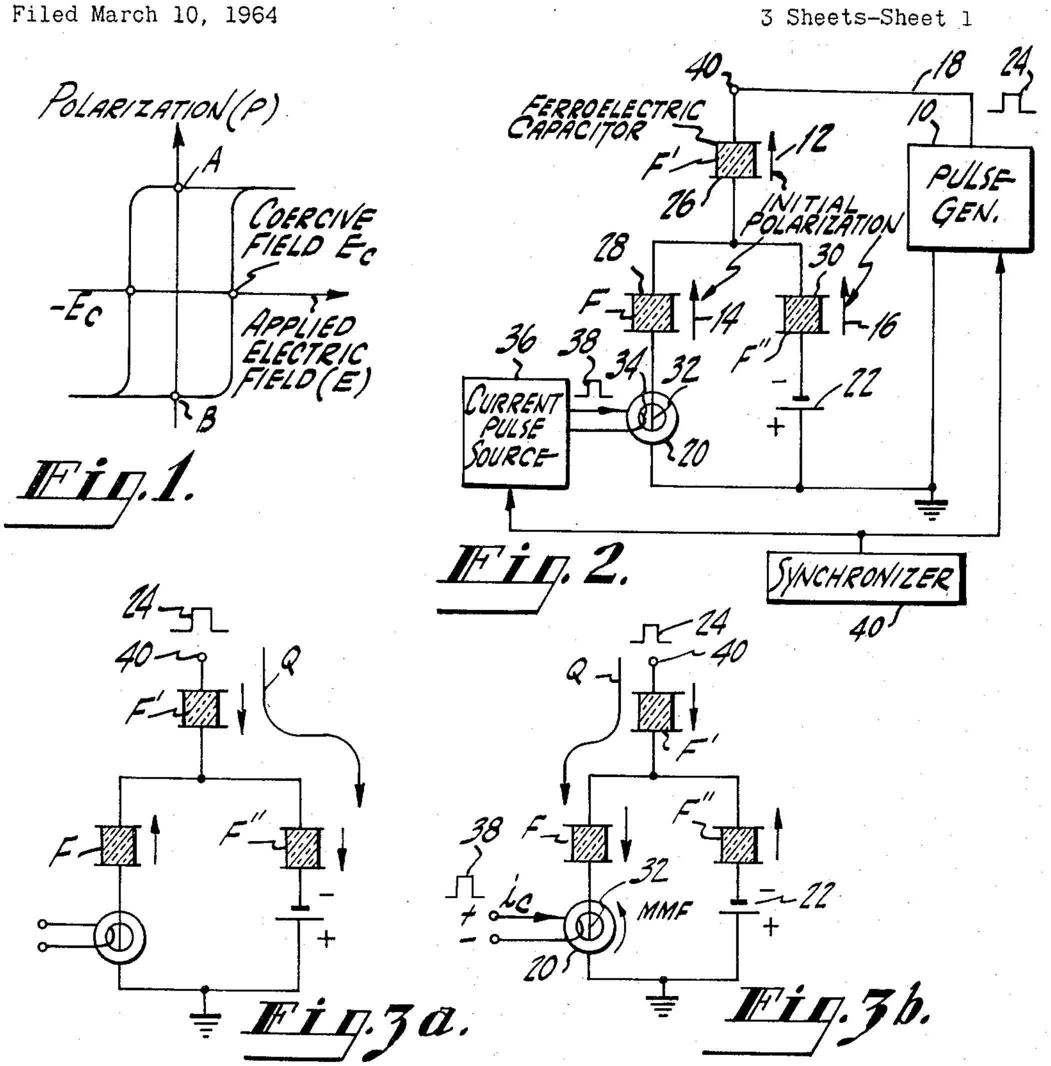
FIGURE 1 is a hysteresis loop of polarization versus applied electric field for a ferroelectric capacitor.
FIGURE 2 is a block and schematic circuit diagram of one form of the circuit according to the present invention.
Figure 4:
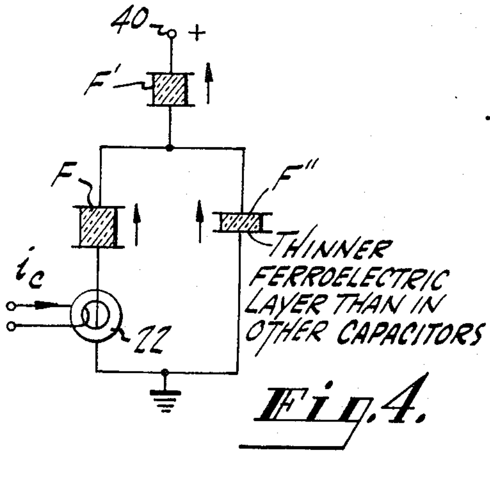
Figure 5:
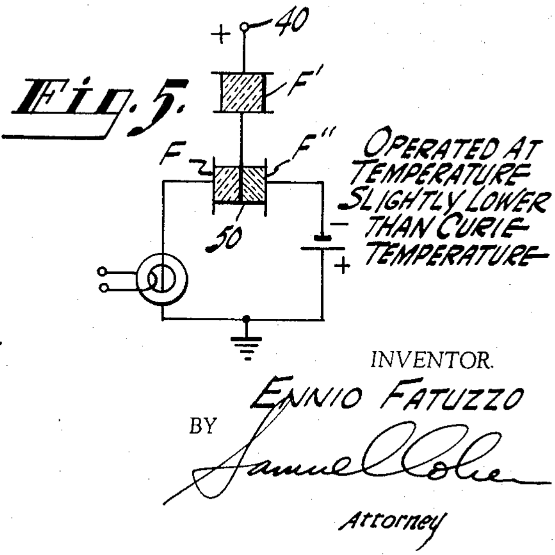
Figure 6B:
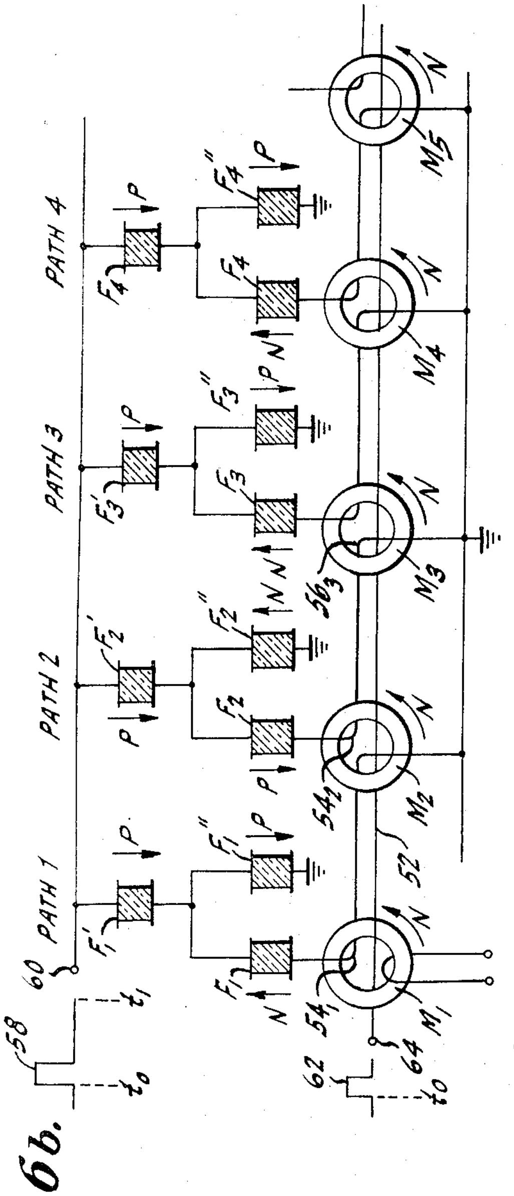
Figure 6C:
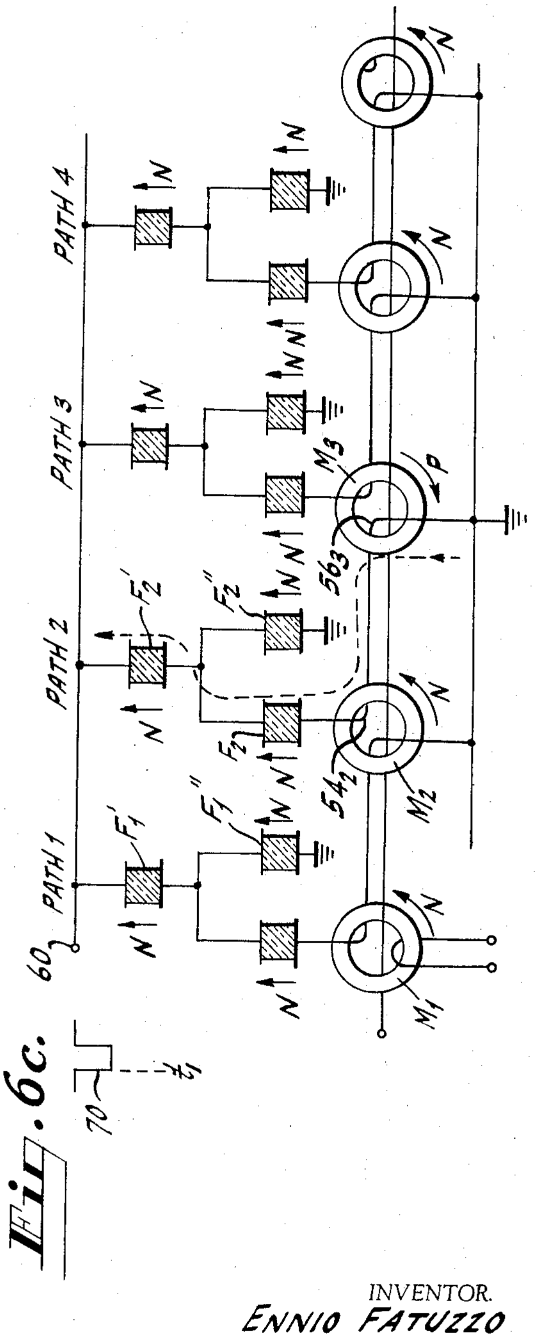
Figure 6A:
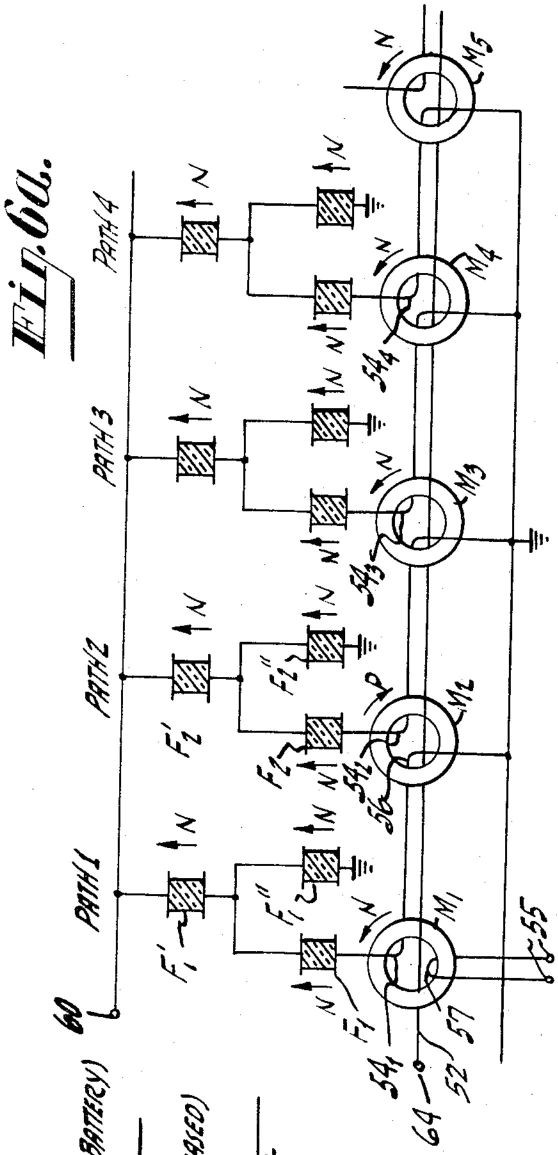
Figure 7:
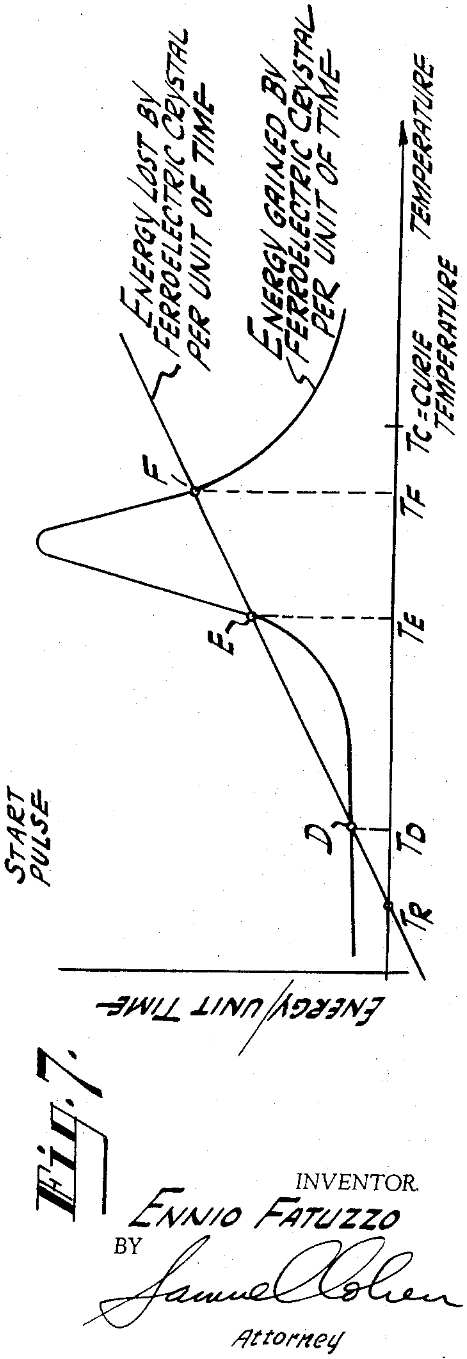
Figure 8:
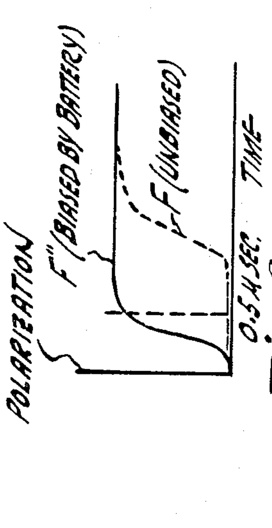

FIGURES 3*a* and 3*b* are schematic drawings to help explain the operation of the circuit of FIGURE 2;

FIGURES 4 and 5 are schematic drawings of modified forms of circuits of the present invention;

FIGURES 6*a*–6*c* are schematic drawings of a form of shift register according to the present invention;

FIGURE 7 is a drawing of energy input versus temperature to help explain the operation of the circuit of FIGURE 5; and FIGURE 8 is a characteristic of polarization versus time for a ferroelectric element.

The relationship between the polarization of the bound charge in a ferroelectric element and the applied electric field is shown in FIGURE 1. Two stable conditions of the element are represented by operating points A and B. One can switch from operating point B, for example, to operating point A by applying a voltage pulse of suitable magnitude and duration across the ferroelectric element.

A circuit according to the present invention is shown in FIGURE 2. It includes a first path connected to parallel-connected second and third paths. A first ferroelectric element (capacitor) F′ is located in the first path; a second ferroelectric element F is located in the second path, and a third ferroelectric element F″ is located in the third path. The elements F′, F and F″ are of the same surface area and, in this embodiment, the elements F and F″ have the same thickness. A pulse generator 10 is connected across the circuit. One terminal of the pulse generator is taken as a reference, indicated by the conventional ground symbol, and the other is connected via lead 18 to terminal 40.

In the operation of the circuit as discussed above, the ferroelectric elements are initially all polarized in the same direction, as indicated by the arrows 12, 14 and 16. These arrows represent the bound charge. In the convention employed, when a ferroelectric element is switched by a source producing a positive pulse, the head of the arrow is caused to face away from the positive terminal of the source. The initial polarization indicated in FIGURE 2 may be obtained by applying a negative pulse of relatively large magnitude to lead 18.

It may be assumed initially that the core 20 and the battery 22 are not in the circuit. It may also be assumed that the three ferroelectric elements are all of the same area, and that F and F″ have the same thickness, as already mentioned. A positive pulse 24 is applied by the pulse generator 10 so as to switch the polarization of ferroelectric capacitor F′ from one state, such as A, to the opposite state, such as B.

As is well understood, in order to switch a ferroelectric element, a charge Q must be deposited onto one electrode of the element and the same charge Q must be taken away from the other electrode of the element. This charge Q is equal to the spontaneous polarization $P_s$ multiplied by the surface area of the ferroelectric element. When the ferroelectric element F′ switches from one state to the other, the charge Q taken away from its lower electrode 26 must deposit on either the upper electrode 28 of ferroelectric element F, or the upper electrode 30 of ferroelectric element F″, or part on the upper electrode 28 and part on the upper electrode 30. If, as stated, elements F and F″ are of the same thickness and neither element is biased, then both elements will partially switch (charge deposited on the upper electrodes of both elements) when the voltage pulse 24 is applied. Neither element F nor F″ will switch completely since there is insufficient charge available to effect complete switching.

If now a battery 22 is placed in series with the ferroelectric element F″ in a polarity to add to the voltage pulse 24 produced by generator 10, then the third path, that is, the path containing ferroelectric element F″, will be a preferred path for the charge Q of element F′. In other words, the charge Q will flow through element F″ rather than element F or rather than part through F and part through F″. This is illustrated in FIGURE 3*a* by the arrow legended Q. Under such circumstances, when the positive pulse 24 is applied, the elements F′ and F″ will switch and the element F will remain in its original polarization state.

FIGURE 8 which is a plot of the switching characteristics of the two elements F″ and F, the former biased and the latter unbiased, illustrates this. The time required to switch a ferroelectric element from one of its polarization states (A in FIGURE 1) to the other (B in FIGURE 1) depends exponentially on the applied electric field. Therefore, if a relatively small bias voltage in the switching direction is applied to a ferroelectric element, its switching time becomes very much shorter than its switching time in its unbiased condition.

In the circuit shown in FIGURE 2, the battery 22 adds this bias voltage (only a few volts are needed). Upon application of the switching pulse 24, element F″ (and F′) switches completely before element F has had the time to start switching. And, after the switching along path F′, F″ has occurred, it is too late for element F to switch because all of the charge Q (FIGURE 3*a*) has been exhausted. In the example shown in FIGURE 8, element F″ has switched completely in 0.5 microsecond, and substantially no partial switching has taken place in element F. (The time given is only an example.)

If the situation above is changed so that the "bias" applied to element F, in the switching direction, slightly exceeds the bias applied to element F″, then the switching pulse 24 causes element F to reverse its polarization and element F″ to remain in its initial polarization state. This occurs in the present circuit when the magnetic core 20 switches its state of magnetic remanence, as is discussed in more detail below. The "bias" applied to element F in this case is actually a voltage pulse—one which appears on the output winding of the core when the core switches.

The core 20 in the circuit of FIGURE 2 has an output winding 32 which is in series with the ferroelectric element F. The core also has an input winding 34 which is connected to a current pulse source 36. The current pulse 38 produced by the source 36 may be synchronized with the pulse 24 produced by the generator 10 by synchronizer circuit 40.

The operation of the circuit of FIGURE 2 is illustrated in FIGURE 3*b*. The current pulse 38 causes a flow of current $i_c$ through the input winding of the core 20. The current pulse is of sufficient amplitude to cause the core to change its state of remanence. The magnetomotive force thereby produced, indicated schematically by the arrow MMF, induces a voltage in the output winding 32 which is in a sense to add to the voltage applied to terminal 40. Further, the magnitude of the voltage in the output winding 32 is arranged to be somewhat greater than that supplied by the battery 22. Accordingly, the second path, that is, the path containing ferroelectric element F, is now preferred to the path containing ferroelectric element F″. Therefore, when the positive voltage pulse 24 is applied to terminal 40 concurrently with the application of the current pulse 38 to the core 20, ferroelectric capacitors F′ and F switch their polarization state, while capacitor F″ remains in its initial polarization state.

To summarize, in the operation of the circuit of FIGURE 2, the relatively small output voltage produced by the core 20 controls an amount of charge Q which is adequate to switch a ferroelectric element F even though the output voltage itself, if applied across the ferroelectric element F, would be only a small fraction of the voltage required to switch element F. The core output voltage essentially acts to steer a charge Q into the desired one of two parallel paths.

The same effect achieved by the battery 22 in the circuit of FIGURE 2 can be obtained by making the ferroelectric element F″ somewhat thinner (thinner by 10% or less, for example) than the ferroelectric element F. This is illustrated in FIGURE 4 (however, for purposes of emphasis, the thinness of the element F″ is exaggerated). The remainder of the circuit is identical to the circuit of FIGURE 2 and is therefore not shown.

When the thickness of the ferroelectric material is reduced, as indicated, a given voltage applied across the ferroelectric element causes a substantially larger electric field to develop across the element. Accordingly, the path F′, F″ will switch in response to a positive pulse applied to terminal 40 and the ferroelectric element F will remain in its original state. However, as in the circuit of FIGURE 2, the circuit parameters are such that when a current $i_c$ is applied to the core 22 concurrently with the application of a positive voltage pulse to terminal 40, the path F′, F becomes preferred to the path F, F″, and the element F changes its polarization state in preference to the element F″.

The circuit of FIGURE 5 is similar to the circuit of FIGURE 3 with the exception that the ferroelectric elements F′ and F″ are close to one another and have a common electrode 50. The amplitude of the pulse supplied to terminal 40 and the pulse repetition frequencies are such that during the operation of the circuit the ferroelectric crystals F′ and F″ become heated to temperatures slightly lower than the Curie temperature. Operation in this way has two important advantages. One is that the operating frequency of the circuit, that is, the rate at which the ferroelectric elements can be switched, is relatively high, upwards of 10 megacycles. The other is that no temperature stabilization is required, as is discussed shortly.

A theoretical discussion of the operation of ferroelectric elements at relatively high temperatures appears in the article "Temperature Autostabilization of TGS Monocrystals in an AC Electric Field," A. Glanc et al., Physics Letters 7, 106, 1963. The curve of FIGURE 7, which is based on curves in the article, will help explain the operation. It is a plot of energy per unit time versus temperature for a ferroelectric crystal. The input energy to the crystal may be in the form of a sinusoidal wave or repetitive pulses or other alternating current voltage. In response to the application of this energy, the crystal gains energy and loses energy. The energy lost, which is in the form of heat lost by the crystal to the surroundings, is represented in FIGURE 7 by the straight line. The energy gained is represented in FIGURE 7 by the straight line. The energy gained is represented in FIGURE 7 by the curved line.

There are three intersections between the two curves of FIGURE 7, namely D, E and F. Intersections D and F define stable operating points and intersection E defines an unstable operating point. If the initial temperature of the crystal is room temperature $T_R$ and an alternating current of not too high amplitude is applied, the crystal will heat up to temperature $T_D$. If, on the other hand, the input alternating voltage applied to the crystal is initially quite high and is then reduced slightly, the temperature assumed by the crystal initially will be somewhat greater than $T_F$ and then will reduce and stabilize at the intersection F corresponding to temperature $T_F$. The temperature $T_F$, it turns out, is somewhat lower than the Curie temperature $T_C$ (for triglycine sulfate, $T_F=48°$ C. and $T_C=50°$ C.), so that at operating point F, the crystal retains its ferroelectric properties.

At the high temperature $T_F$, a ferroelectric material, such as triglycine sulfate, switches extremely rapidly. The crystal can be fully switched around its hysteresis loop (the loop discussed in the article above) at rates of at least 10 megacycles and probably at much higher rates than this.

A second important advantage of operating at an operating point such as F is the self-stabilizing property of the circuit. This can be seen from FIGURE 7. In the region F, the energy-gained curve is extremely steep. Therefore, even if the room temperature $T_R$ should vary, which variation would have the effect of raising or lowering the straight line curve, the operating temperature $T_F$ would remain close to the same value. In view of this, in a circuit of the type shown in FIGURE 5 operated in the manner described, thermostatically controlled ovens or other temperature compensating means are not needed.

A shift register according to the invention is shown in FIGURES 6*a*–6*c*. For purposes of illustration, four stages 1–4 are shown. Each stage contains ferroelectric crystals F, F' and F''. An input winding 52 is common to all of the cores. The output winding of each core, as for example 54, is in series with a second input winding, such as 56 of the following core. The first core $M_1$ has a second input winding, at which input information may be applied.

Each stage also includes a magnetic element M, the output winding of which is in series with the ferroelectric element F. For purposes of identification, a subscript which is the same as the stage number is placed next to the letter identifying each element.

The input ferroelectric elements in the circuit of FIGURE 6*a* are all assumed initially to be polarized in the same direction N. It is also assumed that the cores $M_1$, $M_3$, $M_4$ and $M_5$ are all magnetized in one direction N, whereas the core $M_2$ is magnetized in the opposite direction P. The reversed magnetization of core $M_2$ may be obtained by applying an input pulse to terminals 55 of winding 57 of core $M_1$ in a sense to magnetize core $M_1$ in the P direction, and then shifting this information to the core $M_2$. The method of shifting from core $M_1$ to $M_2$ is similar to the method discussed in detail below for shifting information from core $M_2$ to $M_3$.

FIGURE 6*b* should now be referred to. A positive voltage pulse 58 is applied to terminal 60 concurrently with the application of a current pulse 62 to terminal 64. The input winding 52 is so arranged that the current pulse 62 tends to switch all of the cores into the N state. However, with the exception of core $M_2$, all the cores are already in the N state and therefore substantially no voltage develops at the output windings 54 of cores $M_1$, $M_3$, $M_4$ or $M_5$. The ferroelectric elements F'' are somewhat thinner than the ferroelectric elements F in the various paths. Accordingly, the pulse 58 switches the polarization of the ferroelectric elements F' and F'', from N to P, in paths 1, 3 and 4.

As stated previously, the core $M_2$ is initially in the P state. The current pulse 62 switches this core to the N state. The output voltage developed at winding $54_2$ of core $M_2$ is in a sense to cause charge flow through path $F'_2$, $F_2$ in the same direction as that caused by the voltage pulse 58 applied to terminal 60. Accordingly, in the path 2 the charge Q flows along the path of ferroelectric elements $F'_2$ and $F_2$ so that these ferroelectric elements switch from the N to the P state.

As a result of current pulse 62, all of the cores $M_1$ through $M_5$ are in the N state. The flow of charge in the winding $54_2$ of core $M_2$, as discussed above, is in a sense to switch core $M_2$ back to the P state. However, the magnitude of the charge is insufficient to override the effect of the current pulse 62. The direction of charge flow in winding $56_3$ is such as to tend to switch core $M_3$ to the N state. However, core $M_3$ is already in the N state.

Ferroelectric element $F_2$ is now in the P state, whereas ferroelectric elements $F_1$, $F_3$ and $F_4$ are all in the N state. Similarly, ferroelectric element $F''_2$ is in the N state, whereas all other F'' ferroelectric elements are in the P state.

The next step in the shifting operation is illustrated in FIGURE 6*c*. A negative voltage pulse 70 is applied to terminal 60 at time $t_1$ after the termination of pulses 58 and 62. The effect of this pulse is to switch all ferroelectric elements back to the N state. In paths 1, 3 and 4, the switching is through ferroelectric elements F' and F'', since in paths 1, 3 and 4 these elements are in the N state. However, in path 2, elements $F'_2$ and $F_2$ are in the P state, and therefore they switch to the N state. The switching of these elements causes a flow of charge through the windings $54_2$ of core $M_2$ and $56_3$ of core $M_3$. The direction of charge flow is such as to tend to switch core $M_2$ to the N state and core $M_3$ to the P state. Core $M_2$ is already in the N state, but core $M_3$ does switch to the P state.

Summarizing the operation discussed above, initially core $M_2$ is in the P state and the other cores are in the N state. The concurrent application of voltage pulse 58 and current pulse 62 causes all cores to switch to the N state. It also causes the ferroelectric elements $F'_2$ and $F_2$ in path 2 to switch to the P state and the ferroelectric elements F' and F'' in all other paths to switch to the P state. The subsequent application of negative voltage pulse 70 to terminal 60 switches all ferroelectric elements back to the N state and, in the process, switches core $M_3$ to the P state. Thus, the bit stored in core $M_2$ has been shifted to core $M_3$.

While, for purposes of illustration, the arrangement of FIGURE 4 has been used in the shift register of FIGURE 6, it is to be understood that the other embodiments of the circuit, as for example are shown in FIGURE 5, or FIGURE 2, may be employed instead.

In the embodiments of the invention illustrated, when a direct voltage source, such as a battery, is employed, it is shown in the path in which it is desired to enhance the flow of charge. For example, in the embodiment of FIGURE 2, the battery is shown in the first path so that ferroelectric element F'' normally switches in preference to element F. It should be appreciated that the same effect can be achieved by placing the battery in the other path and reversing its polarity. For example, if a battery is poled to oppose the voltage pulse 24 and is placed in the second path in series with ferroelectric element F, then ferroelectric element F'' will switch in preference to element F.

The same reasoning as above holds for the core 20. If the input winding on the core is reversed or if the direction of current is reversed, then the voltage produced at the output winding will tend to oppose the flow of charge rather than to enhance it. For example, in the arrangement of FIGURE 2, if the direction of current flow in the core is reversed, then the output voltage produced by the core will tend to prevent charge from flowing through ferroelectric element F and thereby cause elements F' and F'' to switch in response to voltage pulse 24. However, with the circuit so arranged, the polarity of battery 22 should be reversed so that in the absence of a current pulse 38, the voltage pulse 24 causes ferroelectric elements F' and F to switch their polarity.

From the discussion above, it should be clear that a number of alternative forms of the circuit, all within the scope of the invention, are possible. In the embodiments shown, the core is located in one leg and the battery in another leg. By suitably arranging the core winding or battery polarity, the same operation can be obtained in the circuit with the magnetic core and battery in the same leg. Further, the battery polarity and core winding or current flow direction can be reversed, as described. Also since no unidirectional elements are required, shifting can be carried out in either direction by suitably arranging the circuit elements and the polarities of the driving sources.

What is claimed is:

1. A switching circuit comprising, in combination:

a circuit including first, second and third paths, the first path connected in series with essentially parallel connected second and third paths;

three ferroelectric storage elements, one located in each of the three paths and each initially polarized in the same direction;

means for applying a voltage across said circuit of a polarity which tends to reverse the polarization of all three ferroelectric elements;

means in at least one of said second and third paths for making the third path a preferred path for the flow of charge with respect to the second path, whereby said applied voltage normally tends to switch the polarization of the ferroelectric elements in the first and third paths and the polarization of the ferroelectric element in the second path tends to remain unchanged; and means in at least one of said second and third paths for applying a signal to its path during the application of said voltage for reversing the preferred status of the second and third paths making the second path a preferred path for the flow of charge with respect to the third path, whereby said means for applying a voltage now tends to switch the polarization of the ferroelectric elements in the first and second paths and the polarization of the ferroelectric element in the third path tends to remain unchanged.

2. The circuit set forth in claim 1, wherein the last-named means comprises a winding in series with one of said second and third paths and means for inducing a voltage across said winding.

3. The circuit set forth in claim 2, wherein said winding is a winding of a magnetic core and further including a second winding on said core for switching the magnetic state of said core and thereby inducing a voltage across said first-named winding.

4. A switching circuit comprising, in combination:

a preferred first path for the flow of charge including a first ferroelectric storage element;

a nonpreferred second path for the flow of charge in parallel with the first path and including a second ferroelectric element polarized in the same direction as the first ferroelectric element and also including the winding of a magnetic core;

means for changing the status of the second path to one which is preferred for the flow of charge over the first path comprising means for switching the magnetization of said core; and means for applying a charge to the two paths in a sense to tend to switch the polarization of said ferroelectric elements concurrently with the switching of said core.

5. In a switching circuit, three ferroelectric elements, initially polarized in the same direction;

a circuit including three paths, the first path connected in series with essentially parallel connected second and third paths, one ferroelectric element located in each said path, and the third path being a preferred path with respect to the second path for the flow of charge;

means for applying a voltage across said circuit of a polarity which tends to reverse the polarization of all three elements; and signal responsive means comprising the output winding of a magnetic core in the second path for steering the charge switched when the polarization of the ferroelectric element in the first path is reversed, into the second path in preference to the third path.

6. In a switching circuit, three ferroelectric elements initially polarized in the same direction;

a voltage source;

a circuit including first, second and third paths, the first path connected in series with essentially parallel connected second and third paths, one ferroelectric element located in each said path, and said voltage source located in said third path for increasing the tendency of charge to flow in a preferred one of the second and third paths;

means for applying a voltage across said circuit of a polarity which tends to reverse the polarization of all three elements, whereby charge tends to flow through the first path and said preferred one of the second and third paths; and signal responsive means in one of the second and third paths for steering the charge switched when the polarization of the ferroelectric element in the first path is reversed, into the nonpreferred one of the second and third paths.

7. In a switching circuit, three ferroelectric elements, initially polarized in the same direction, one said element having a smaller thickness than the other two elements;

a circuit including three paths, one ferroelectric element located in each said path, and the ferroelectric element of smaller thickness being located in the third path, whereby said third path is preferred for the flow of charge than the second path;

means for applying a voltage across said circuit of a polarity which tends to reverse the polarization of all three elements; and signal responsive means in the second path for steering the charge switched when the polarization of the ferroelectric element in the first path is reversed, into the second path in preference to the third path.

8. A circuit including a first path connected to parallel-connected second and third paths;

three ferroelectric elements, initially polarized in the same direction, one in each said path;

means for applying a voltage across said circuit of a polarity which tends to reverse the polarization of all three elements; and charge steering means each associated with one of the second and third paths, at least one of which comprises a magnetic element which is responsive to a switching signal applied thereto, for steering the charge switched in the first ferroelectric element into the second path in the presence of said signal and into the third path in the absence of said signal.

9. In a switching circuit, three ferroelectric elements, initially polarized in the same direction;

a voltage source;

a circuit including first, second and third paths, the first path connected in series with essentially parallel connected second and third paths, one ferroelectric element located in each said path, and said voltage source located in said third path for increasing the tendency of charge to flow in a preferred one of the second and third paths;

means for applying a voltage across said circuit of a polarity which tends to reverse the polarization of all three elements, whereby charge tends to flow through the first path and said preferred one of the second and third paths; and signal responsive magnetic core means having an output winding in one of the second and third paths, for producing an output voltage for steering the charge switched when the polarization of the ferroelectric element in the first path is reversed, into the nonpreferred one of the second and third paths.

10. In a switching circuit, three ferroelectric elements, initially polarized in the same direction, one said element having smaller thickness than the other two elements;

a circuit including three paths, one ferroelectric element located in each said path, and the ferroelectric elements of smaller thickness being located in the third path, whereby said third path exhibits to lower impedance to the flow of charge than the second path;

means for applying a voltage across said circuit of a polarity which tends to reverse the polarization of all three elements; and magnetic core means in the second path which, when switched from one state of magnetization to the other, steers the charge switched when the polarization of the ferroelectric element in the first path is reversed, into the second path in preference to the third path.

11. A shift register comprising, in combination, a plurality of ferroelectric charge steering networks, each including a preferred path for charge flow which includes a ferroelectric element and a nonpreferred path for charge flow which includes a ferroelectric element, whereby when a voltage is applied to said network, the ferroelectric element in the preferred path tends to change its state of polarization; and a plurality of magnetic elements, one in each network, each for producing an output voltage of a magnitude sufficient to steer charge into the nonpreferred path, whereby when a core is switched concurrently with the application of a voltage to the network in which the core is located, the charge flows into the nonpreferred path and tends to switch the ferroelectric element therein.

12. A shift register comprising, in combination, a plurality of ferroelectric charge steering networks, each including a preferred path for charge flow which includes a ferroelectric element and a nonpreferred path for charge flow which includes a ferroelectric element, whereby when a voltage is applied to said network, the ferroelectric element in the preferred path tends to change its state of polarization;

a plurality of magnetic elements, one in each network, each for producing an output voltage of a magnitude sufficient to steer charge into the nonpreferred path, whereby when a core is switched concurrently with the application of a voltage to the network in which the core is located, the charge flows into the nonpreferred path and tends to switch the ferroelectric element therein;

means for concurrently applying a voltage to all networks and a switching signal to all cores, whereby in the networks in which a core is switched, the ferroelectric element in the nonpreferred path is switched, whereas in the network in which a core is not switched, the ferroelectric element in the preferred path is switched;

means for applying a voltage of opposite polarity to all networks for switching all ferroelectric elements back to their original polarization state; and means responsive to the switching of a ferroelectric element in a nonpreferred path back to its original polarization state for switching the state of magnetic remanence of the core in the succeeding path to its opposite state of remanence.

References Cited

UNITED STATES PATENTS 3,179,926 4/1965 Wolfe ------------ 340—173.2

TERRELL W. FEARS, *Primary Examiner.*